United States Patent
Akhtar et al.

(10) Patent No.: US 10,803,446 B2
(45) Date of Patent: Oct. 13, 2020

(54) SYSTEM AND METHOD FOR TRANSMITTING PAYMENT CARD INFORMATION, AND PAYMENT CARD

(71) Applicant: MASTERCARD INTERNATIONAL INCORPORATED, Purchase, NY (US)

(72) Inventors: Wardah Salman Akhtar, New Delhi (IN); Anshul Pandey, White Plains, NY (US); Dinesh Kumar Lal, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/102,062

(22) Filed: Aug. 13, 2018

(65) Prior Publication Data

US 2019/0066093 A1  Feb. 28, 2019

(30) Foreign Application Priority Data

Aug. 30, 2017 (SG) .......................... 10201707094V (51) Int. Cl.
*G06Q 20/34* (2012.01)
*G06Q 20/40* (2012.01)
*G07F 7/08* (2006.01)

(52) U.S. Cl.
CPC .......... *G06Q 20/341* (2013.01); *G06Q 20/34* (2013.01); *G06Q 20/409* (2013.01); *G07F 7/082* (2013.01)

(58) Field of Classification Search
CPC .... G06Q 20/341; G06Q 20/34; G06Q 20/409; G07F 7/082
See application file for complete search history.

(56) References Cited

U.S. PATENT DOCUMENTS 3,596,249 A * 7/1971 Tierney .................... G06K 9/18
                                                          235/380
5,031,225 A * 7/1991 Tachikawa ........... G06K 9/3208
                                                          382/185

(Continued)

OTHER PUBLICATIONS

Electrostatic Discharge (ESD) in Payment Terminals, Smart Payment Association (Year: 2012).*

(Continued)

*Primary Examiner* — Bruce I Ebersman
*Assistant Examiner* — Brock E Turk
(74) *Attorney, Agent, or Firm* — Budzyn IP Law, LLC (57) ABSTRACT

A system and a method for transmitting payment card information are provided. The system includes at least one memory including computer program code configured to, with at least one processor, cause the system at least to (i) receive, from a capacitive touch sensor, input signals generated in response to conductive elements of a payment card that is placed on the capacitive touch sensor, the conductive elements disposed on the payment card information present on the payment card, (ii) determine, using th e input signals, an orientation of the payment card that is placed on the capacitive touch sensor, (iii) compare the determined orientation with a reference orientation associated with the payment card, (iv) generate computer-readable payment card information based on the input signals on a condition that the determined orientation corresponds to the reference orientation, and (v) transmit the computer-readable payment card information to a payment processor module.

9 Claims, 7 Drawing Sheets

(56) References Cited

U.S. PATENT DOCUMENTS

| | | | | |
|---|---|---|---|---|
| 5,077,811 A * | 12/1991 | Onda | ............... | G06K 9/3208 |
| | | | | 382/290 |
| 5,475,768 A | 12/1995 | Diep et al. | | |
| 5,742,702 A | 4/1998 | Oki | | |
| 8,803,814 B2 | 8/2014 | Andolina | | |
| 8,903,136 B1 * | 12/2014 | Wang | ............... | G06K 9/00979 |
| | | | | 382/112 |
| 9,111,406 B2 * | 8/2015 | Aubert | ............... | G06F 3/044 |
| 2005/0152602 A1 * | 7/2005 | Chen | ............... | G06K 9/222 |
| | | | | 382/187 |
| 2011/0284632 A1 * | 11/2011 | Mullen | ............... | G06Q 20/352 |
| | | | | 235/380 |
| 2013/0044078 A1 * | 2/2013 | Hallenberg | ............... | G06F 3/039 |
| | | | | 345/174 |
| 2013/0182182 A1 * | 7/2013 | Mountain | ............... | H04N 21/44008 |
| | | | | 348/564 |
| 2013/0284578 A1 * | 10/2013 | Foerster | ............... | G06K 7/081 |
| | | | | 200/600 |
| 2014/0119615 A1 * | 5/2014 | Mercolino | ............... | G07D 7/004 |
| | | | | 382/112 |
| 2015/0006376 A1 * | 1/2015 | Nuthulapati | ............... | G06Q 20/40145 |
| | | | | 705/41 |
| 2015/0348009 A1 * | 12/2015 | Brown | ............... | G06Q 20/3227 |
| | | | | 705/16 |
| 2017/0039567 A1 * | 2/2017 | Stern | ............... | G06Q 20/409 |
| 2018/0025261 A1 * | 1/2018 | Mosteller | ............... | G06K 19/07745 |
| | | | | 235/488 |

OTHER PUBLICATIONS

Zanero, Smart Card Content Security (Year: 1997).*
Schmitt, Data Tag Cards, https://philippschmitt.com/, pp. 1-4 (Year: 2017).*

* cited by examiner

SYSTEM AND METHOD FOR TRANSMITTING PAYMENT CARD INFORMATION, AND PAYMENT CARD

TECHNICAL FIELD

The present invention generally relates to a payment card, and a system and method for transmitting payment card information.

BACKGROUND ART

With extensive adoption across all demographics due to ease of use, affordability and constant connectivity, smartphones, particularly ones with capacitive touch screens, have overtaken desktop computers and laptops to become one of the preferred platforms for online purchases. Indeed, since users usually carry their smartphone around with them, smartphones are also increasingly used as a payment device in mobile payments.

However, while a smartphone can offer the above advantages, a user may still find it time-consuming to complete a purchase using the smartphone. This is particularly the case when the user has to input payment card details each time a purchase is made online (either through an application or a website), unless the user saves the payment card details on the device or with the application/website in advance. Yet, the user may be reluctant to save the payment card details on the device, or with the application/website due to concerns with credit card fraud. Further, a user may also be reluctant to link one or more payment card details with digital wallets despite their popularity due to concerns with biometric identity theft and reliability of biometric identification methods. Users may also shun traditional authentication means such as passwords as a result of excessive use and proliferation.

Credit card fraud, generally used to describe theft and fraud committed using or involving a payment card as a fraudulent source of funds in a transaction, is an issue for payment card issuers and payment card users. Credit card fraud has caused large financial losses. Particularly, online/mobile credit card fraud is a growing issue to card issuers, merchants and payment card users alike, as fraudsters target increasingly common online payments using stolen card details. Fraudsters often exploit the inability of a merchant to physically inspect the payment card during online card-not-present transactions. While preventive measures have been developed to address online credit card fraud, such preventive measures have low user adoption rates as they are often cumbersome and complicated.

Accordingly, what is needed is a system and method for transmitting payment card information that seeks to address some of the above problems. Furthermore, other desirable features and characteristics will become apparent from the subsequent detailed description and the appended claims, taken in conjunction with the accompanying drawings and this background of the disclosure.

SUMMARY OF INVENTION

A first aspect of the present invention provides a system configured to transmit payment card information, the system including, at least one processor, and at least one memory including computer program code, the at least one memory and the computer program code configured to, with the at least one processor, cause the system at least to receive, from a capacitive touch sensor, input signals generated in response to conductive elements of a payment card that is placed on the capacitive touch sensor, the conductive elements disposed on the payment card information present on the payment card, determine, using the input signals, an orientation of the payment card that is placed on the capacitive touch sensor, compare the determined orientation with a reference orientation associated with the payment card, generate computer-readable payment card information based on the input signals on a condition that the determined orientation corresponds to the reference orientation, and transmit the computer-readable payment card information to a payment processor module.

A second aspect of the present invention provides a method for transmitting payment card information. The method includes receiving, from a capacitive touch sensor, input signals generated in response to conductive elements of a payment card that is placed on the capacitive touch sensor, the conductive elements disposed on the payment card information present on the payment card, determining, using the input signals, an orientation of the payment card that is placed on the capacitive touch sensor, comparing the determined orientation with a reference orientation associated with the payment card, generating computer-readable payment card information based on the input signals on a condition that the determined orientation corresponds to the reference orientation, and transmitting the computer-readable payment card information to a payment processor module.

A third aspect of the present invention provides a non-transitory computer readable medium having stored thereon an application which when executed by a computer causes the computer to perform steps including, receiving, from a capacitive touch sensor, input signals generated in response to conductive elements of a payment card that is placed on the capacitive touch sensor, the conductive elements disposed on the payment card information present on the payment card, determining, using the input signals, an orientation of the payment card that is placed on the capacitive touch sensor, comparing the determined orientation with a reference orientation associated with the payment card, generating computer-readable payment card information based on the input signals on the condition that the determined orientation corresponds to the reference orientation, and transmitting the computer-readable payment card information to a payment processor module.

A fourth aspect of the present invention provides a payment card including conductive elements disposed on payment card information present on a first face of the payment card, wherein the conductive elements are electrically connected to a conductive portion disposed on a second face of the payment card.

A fifth aspect of the present invention provides a method of manufacturing a payment card, the method including, providing the payment card having a first face and a second face, the payment card comprising payment card information that is printed and/or embossed on the first face of the payment card, disposing conductive elements on the payment card information, disposing a conductive portion on the second face of the payment card, and electrically connecting the conductive elements disposed on the payment card information with the conductive portion disposed on the second face of the payment card.

BRIEF DESCRIPTION OF DRAWINGS

Embodiments of the invention will be better understood and readily apparent to one of ordinary skill in the art from the following written description, by way of example only, and in conjunction with the drawings, in which:

FIG. 6a shows an illustration of a character within a pixel image, while

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

Overview

Embodiments of the present invention provide a payment card, method and system for transmitting payment card information that can beneficially address users' reluctance to store payment card information on mobile devices, applications or websites. Embodiments of the present invention can also advantageously authenticate a user and verify if the user has physical possession of the payment card used in a transaction.

In various embodiments, the payment card includes conductive elements disposed on the payment card information present on the payment card. The payment card information can include name of payment card account holder, payment card number, payment card expiration date and/or card verification code. The payment card information can be printed and/or embossed the payment card, with the conductive elements disposed thereon. The conductive elements can come into proximity or contact with a capacitive touch sensor, such that the conductive elements cause a variance in the electrical properties of the capacitive touch sensor, which then generates input signals in response to the variance. In other words, the payment card is configured such that the embossed payment card information is sensed by the capacitive touch sensor when the payment card is placed on the sensor, and the input signals generated is associated with the payment card information.

An orientation of the payment card that is placed on the capacitive sensor can be determined based on the input signals. The determined orientation can be compared with a reference orientation that is associated with the payment card, and which is known only to the user. Thus, the orientation of the payment card that is placed on the capacitive sensor can advantageously serve as a means for authenticating a user. As the authentication means requires the presence of the actual payment card, embodiments of the present invention can also be beneficially used to augment or replace existing payment card security measures, and can advantageously reduce prevalence of online/mobile credit card fraud.

The payment card information, in the form of input signals, can be identified as individual characters, generated into computer-readable format and transmitted to a payment processor module. Individual characters in the payment card information can be identified and combined to form the payment card information using artificial neural networks. Thus, embodiments of the present invention can eliminate the need for users to store or manually enter payment card information on the device or with an application/website in a transaction.

Accordingly, embodiments of the present invention can advantageously provide a simplified and streamlined system and method to users and merchants as well. Various embodiments provide a system and method that can receive, determine and communicate authenticity and payment card information in a safe and efficient manner.

Exemplary Embodiments

Embodiments of the present invention will be described, by way of example only, with reference to the drawings. Like reference numerals and characters in the drawings refer to like elements or equivalents.

Payment Card

Figure 1:
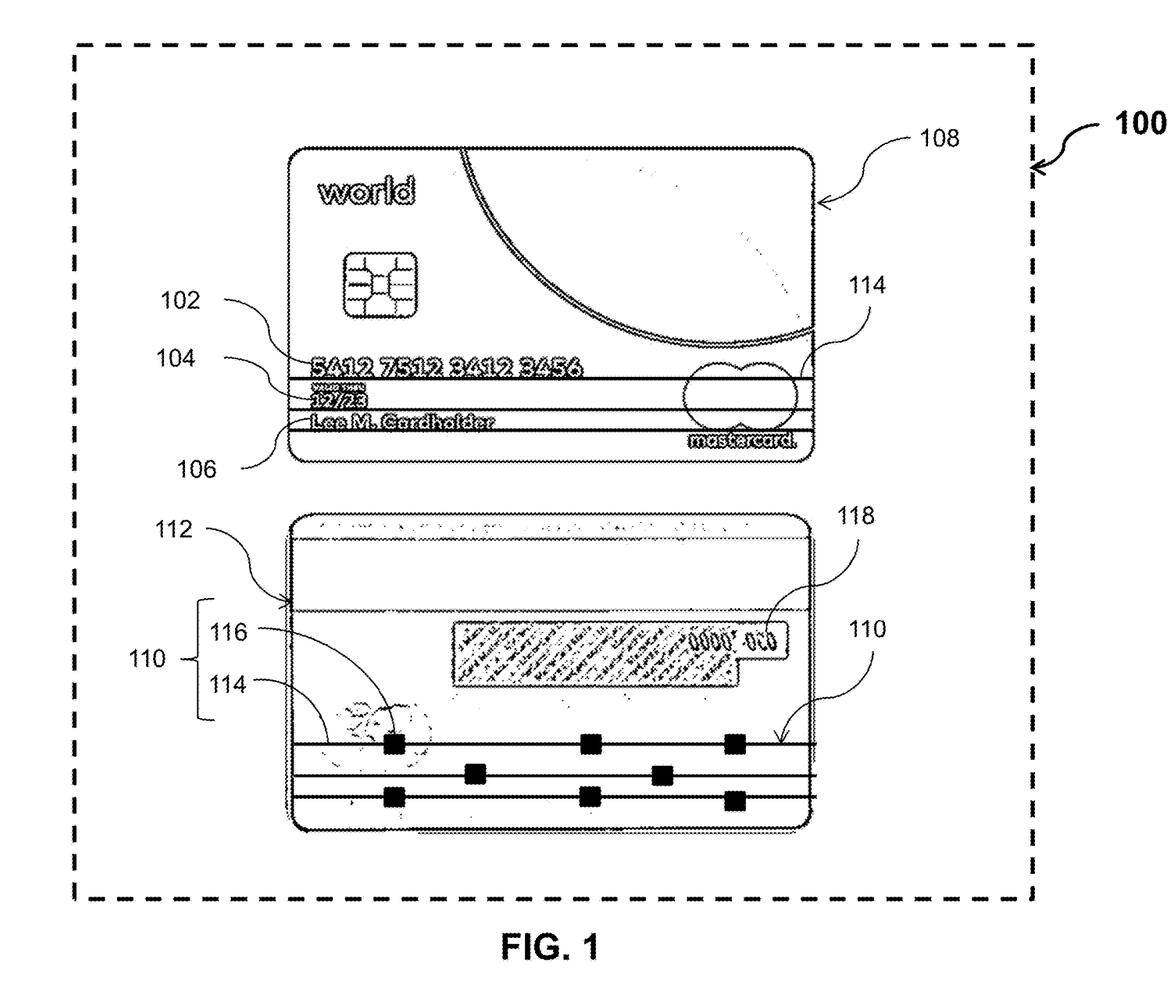
FIG. 1 shows front and back views of a payment card including conductive elements disposed thereon in accordance with embodiments of the invention.

FIG. 1 shows front and back views of a payment card 100 including conductive elements 102, 104, 106 in accordance with embodiments of the invention. The conductive elements 102, 104, 106 are disposed on payment card information present on a first face 108 of the payment card 100 (shown as front view of the payment card 100). The conductive elements 102, 104, 106 are electrically connected to a conductive portion 110 disposed on a second face 112 of the payment card 100 (shown as back view of the payment card 100). In various embodiments, the payment card information, on which the conductive elements 102, 104, 106 are disposed, can include one or more of: name of payment card account holder, payment card number, and payment card expiration date. The name of the payment card account holder, the payment card number, the payment card expiration date can be printed and/or embossed on a first face 108 of the payment card 100.

The conductive portion 110 disposed on the second face 112 of the payment card 100 is configured to receive physical contact with human skin. In various embodiments, the conductive portion 110 can be configured to a size and/or arrangement optimal for placement of one or more human digits (e.g. thumb or index finder) on the conductive portion 110. For example, as shown in FIG. 1, the conductive portion 110 is shown to include conductive traces 114 with interspaced conductive pads 116. The interspaced conductive pads 116 are electrically connected to the conductive traces 114 and are spaced apart to maximize contact with the one or more human digits that is placed on the second face 112 of the payment card 100. It can be appreciated that the conductive portion 110 may be of a different configuration (e.g. of any pattern and/or located on a different area of the second face 112 of the payment card 100) Similarly, the conductive traces 114 and conductive pads 116 may be of a different configuration (e.g. of different width and size) sufficient for providing a location for contact with human skin or placement of one or more human digits.

In various embodiments, the conductive portion 110 that is disposed on the second face 112 of the payment card 100 may further include a conductive element 118 disposed on a card verification code that is printed or embossed on the second face 112 of the payment card 100. The conductive element 118 disposed on the card verification code can be electrically connected to the conductive portion 110 via extensions (not shown) from the conductive traces 114.

Further, the conductive traces 114 on the second face 112 may be disposed on the surfaces of the payment card 100 such that the conductive traces 114 loop around the payment card 100 towards the first face 108, and electrically connect the conductive elements 102, 104, 106 disposed on the payment card information present on the first face 108 to the conductive portion 110. In other words, the conductive traces 114 electrically connect the conductive elements 102, 104, 106 disposed on the payment card information to the conductive portion 110 on the second face 112 such that the conductive elements 102, 104, 106 can cause a variance in the electrical properties of a capacitive touch sensor through conductive portion 110, when the first face 108 of the payment card 100 is placed in contact with or in proximity to the capacitive touch sensor. Accordingly, the capacitive sensor can, in response to the variance in the electrical properties, generate input signals which are based on configuration of the conductive elements 102, 104, 106.

In some embodiments, the conductive traces 114 which are disposed on the first face 108 of the payment card can also include conductive pads. Similarly, the conductive element 118 can also cause a variance in the electrical properties of the capacitive touch sensor through the conductive elements 102, 104, 106 when the second face 112 of the payment card 100 is placed in contact with or in proximity to the capacitive touch sensor. The capacitive sensor can also generate input signals which are based on configuration of the conductive element 118 in response to the variance in the electrical properties.

Accordingly, the payment card 100 in embodiments of the present invention, having the conductive elements and the conductive portion disposed thereon, can be advantageously recognized by various capacitive touch sensors, particularly those that are available on screens of smartphones. As the payment card information on the payment card 100 is capable of being registered by capacitive touch sensors, use of the payment card 100 with capacitive touch sensors can advantageously eliminate the need for users to manually enter payment card information in a transaction. Further, as will be explained in more detail below, the payment card 100, together with system and method of transmitting payment card information can also be advantageously used to authenticate a user and to verify if the user is in actual possession of the payment card 100.

Moreover, it can also be appreciated that the disposition of the conductive portion 110 and the conductive elements 102, 104, 106, 118 on surfaces of the payment card 100 can be an additional step (or steps) to the manufacture of a conventional payment card. In other words, the payment card 100 can be manufactured through at least the disposition of the conductive portion 110 and the conductive elements 102, 104, 106, 118 on surfaces of the conventional payment card, and can therefore advantageously minimize disruption to the conventional manufacturing process while cost-efficiently providing a secure authentication means when combined with the system and method of transmitting payment card information, compared to traditional authentication means which can require additional hardware (e.g. security token).

Figure 2:
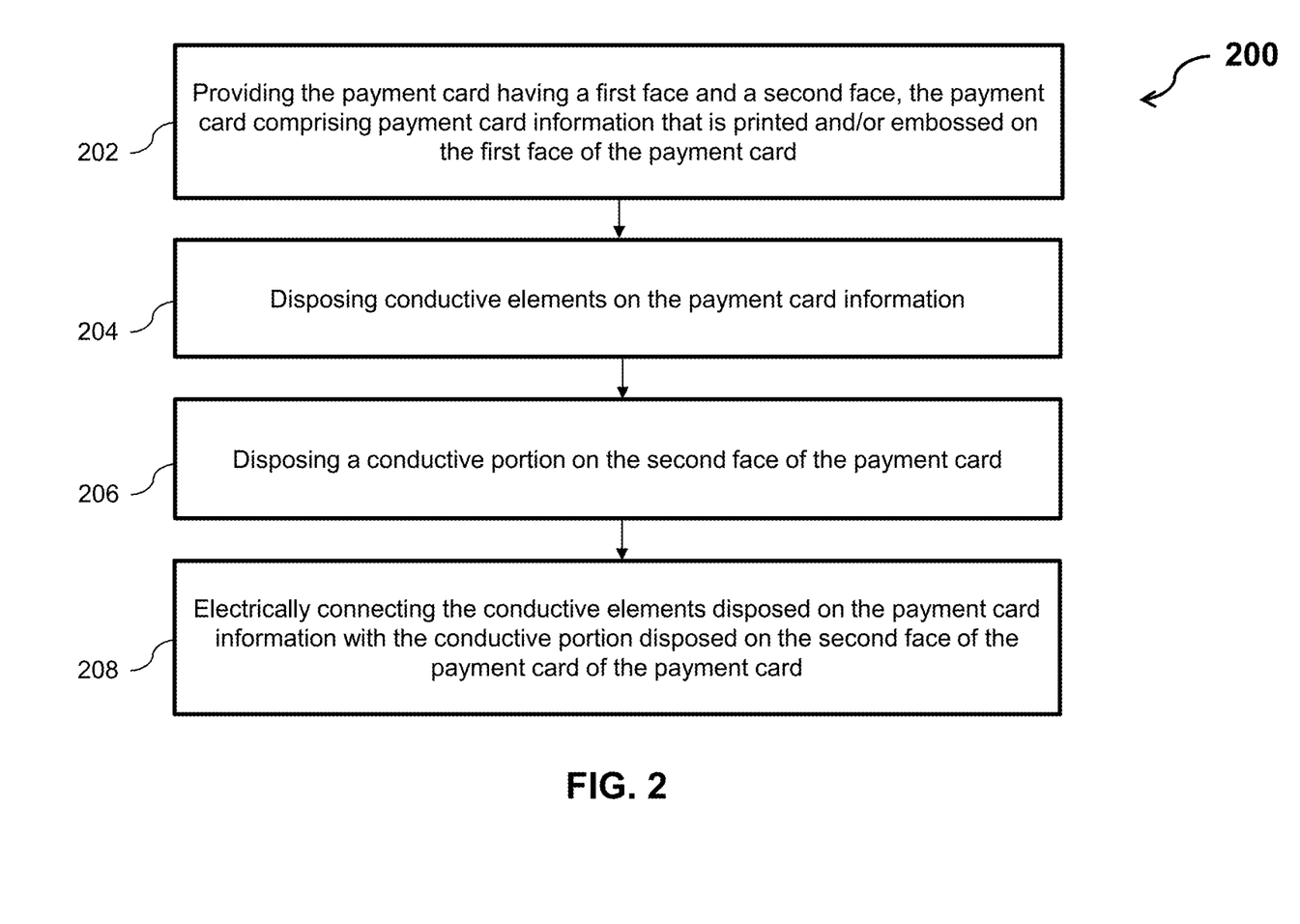
FIG. 2 shows a flowchart illustrating a method of manufacturing a payment card in accordance with embodiments of the invention.

FIG. 2 shows a flowchart illustrating a method 200 of manufacturing a payment card in accordance with embodiments of the invention.

At step 202, a payment card is provided. The payment card includes a first face and a second face. The payment card also includes payment card information that is printed and/or embossed on the first face of the payment card. The payment card information includes one or more of: name of payment card account holder, payment card number, and payment card expiration date. At step 204, conductive elements are disposed on the payment card information. At step 206, a conductive portion is disposed on the second face of the payment card. The conductive portion is configured to receive contact with the human skin. At step 208, the conductive elements disposed on the payment card information is electrically connected with the conductive portion disposed on the second face of the payment card. The step of electrically connecting the conductive elements disposed on the payment card information and the conductive portion disposed on the second face of the payment card may include disposing conductive traces on surfaces of the payment card, such that the conductive traces loop around the payment card to connect the conductive elements with the conductive portion.

Further, in various embodiments, the step 206 of disposing the conductive portion on the second face of the payment card may include disposing a conductive element on a card verification code that is printed or embossed on the second face of the payment card. The conductive elements, the conductive portion and the conductive traces may include conductive materials such as metals, metal alloys, graphite, conductive polymers and/or other conductive materials known in the art.

System and Method for Transmitting Payment Card Information

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "identifying", "receiving", "scanning", "calculating", "determining", "replacing", "generating", "transmitting", "comparing" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may include a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on a computer effectively results in an apparatus that implements the steps of the preferred method.

In embodiments of the present invention, use of the term 'server' may mean a single computing device or at least a computer network of interconnected computing devices which operate together to perform a particular function. In other words, the server may be contained within a single hardware unit or be distributed among several or many different hardware units.

Figure 3:
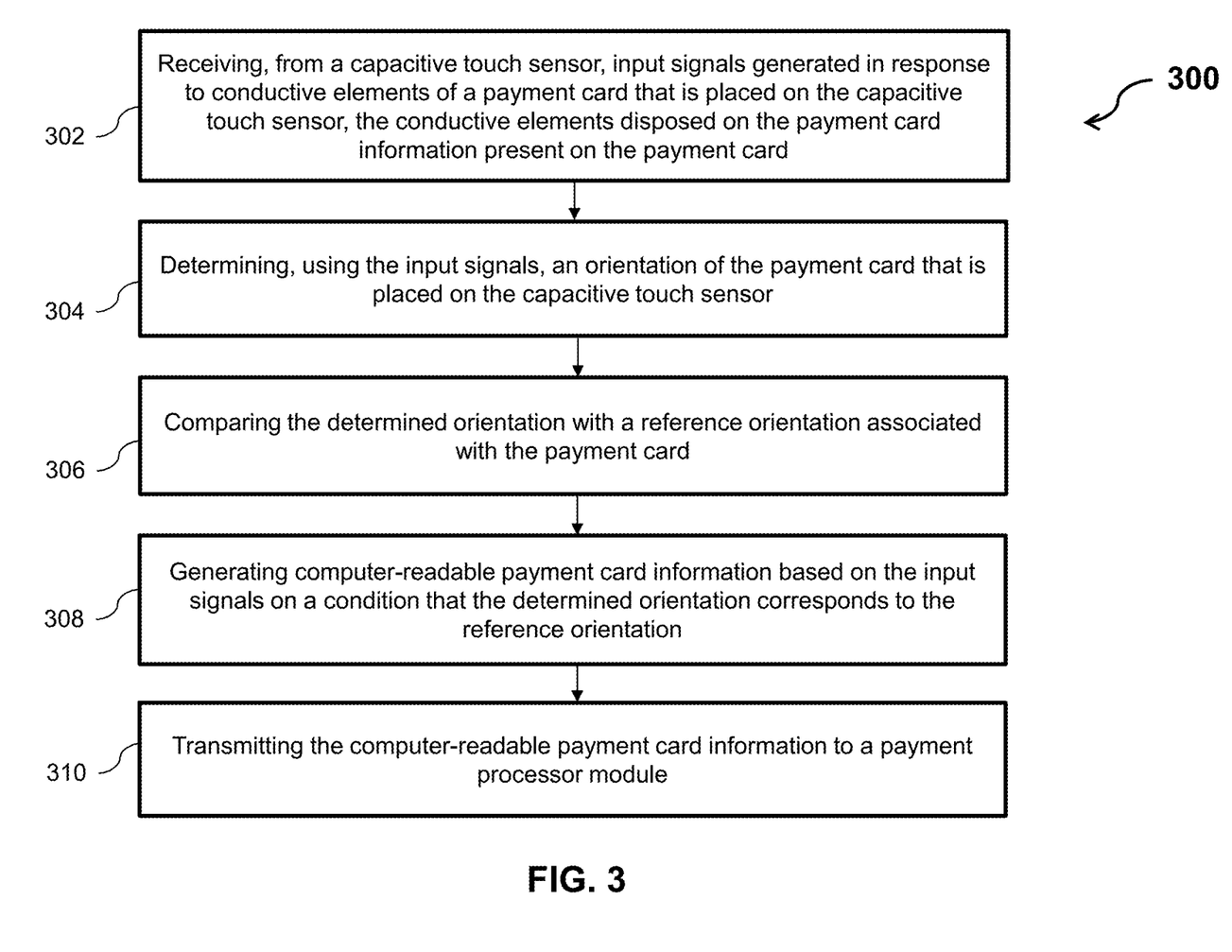
FIG. 3 shows a flowchart illustrating a method for transmitting payment card information in accordance with embodiments of the invention.

FIG. 3 shows a flowchart illustrating a method 300 for transmitting payment card information in accordance with embodiments of the invention.

The method 300 broadly includes:
a. step 302: receiving, from a capacitive touch sensor, input signals generated in response to conductive elements of a payment card that is placed on the capacitive touch sensor, the conductive elements disposed on the payment card information present on the payment card;
b. step 304: determining, using the input signals, an orientation of the payment card that is placed on the capacitive touch sensor;
c. step 306: comparing the determined orientation with a reference orientation associated with the payment card;
d. step 308: generating computer-readable payment card information based on the input signals on the condition that the determined orientation corresponds to the reference orientation; and
e. step 310: transmitting the computer-readable payment card information to a payment processor module.

At step 302, input signals are received. The input signals are generated by a capacitive touch sensor in response to conductive elements of a payment card that is placed on the capacitive touch sensor. The conductive elements are disposed on the payment card information present on the payment card. An exemplary embodiment of the payment card can be the payment card 100 shown in FIG. 1, and the conductive elements can be the conductive elements 102, 104, 106 disposed on the payment card information present on the first face 108 of the payment card 100. As will be described in more detail later, in an embodiment, the capacitive touch sensor can be a capacitive touch sensor 402 included in touchscreen of system 400 shown in FIG. 4.

Figure 4:
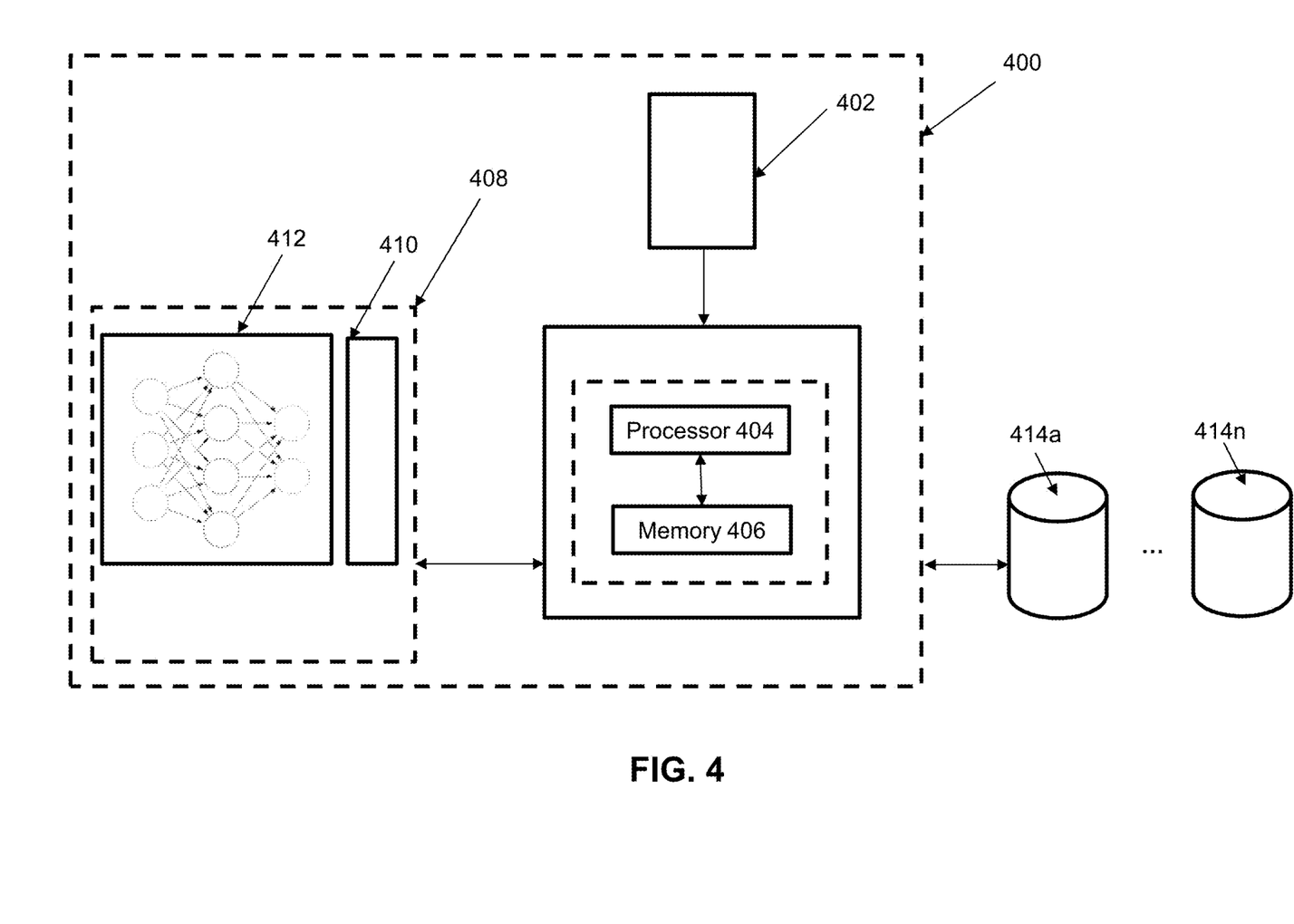
FIG. 4 shows a schematic diagram of a system configured to transmit payment card information in accordance with embodiments of the invention.

In embodiments of the invention, the placement of the payment card 100 on the capacitive touch sensor 402 may be initiated by a user in response to a prompt generated by the system 400. Advantageously, the placement of the payment card 100 can serve as a authentication factor in authentication process of the user in a transaction, as the presence of the payment card and the payment card will be identified by at least the capacitive touch sensor in the method 300. Specifically, the payment card 100 can serve as a possession factor in an authentication process, and can be advantageously used to replace security tokens in certain transaction scenarios. Further, the prompt for placement of the payment card 100 can be an intermediate step in an online transaction process which is automatically generated by an application or website in response to absence of payment card information. The payment card 100 can placed on the capacitive touch sensor 402 such that the conductive elements 102, 104, 106 are in contact with the capacitive touch sensor 402. The conductive elements 102, 104, 106 can cause a variance in the electrical properties of the capacitive touch sensor 402, which in turn generates the input signals in response to the variance. In other words, the capacitive touch sensor 402 can read multiple activated contacts by the conductive elements 102, 104, 106, and can generate input signals corresponding to the multiple activated contacts. The input signals are associated with the payment card information on the payment card 100.

At step 304, an orientation of the payment card that is placed on the capacitive touch sensor is determined using the input signals generated by the capacitive touch sensor. The determined orientation can be compared with a reference orientation that is associated with the payment card which is known only to the user to authenticate a user. Thus, the orientation of the payment card on the capacitive screen can serve as a knowledge factor in an authentication process, and can be advantageously used to replace use of passwords in certain transaction scenarios. In embodiments of the present invention, the step of determining an orientation of the payment card can include:
a. step 304a: obtaining one or more pixel images associated with the payment card information based on the input signals;
b. step 304b: identifying a character within the one or more pixel images;
c. step 304c: generating a character-orientation set using the identified character, the character-orientation set including one or more patterns corresponding to the identified character in one or more orientations; and
d. step 304d: determining the orientation of the payment card by matching a pattern in the character-orientation set with the identified character within the one or more pixel images.

Figure 6A:
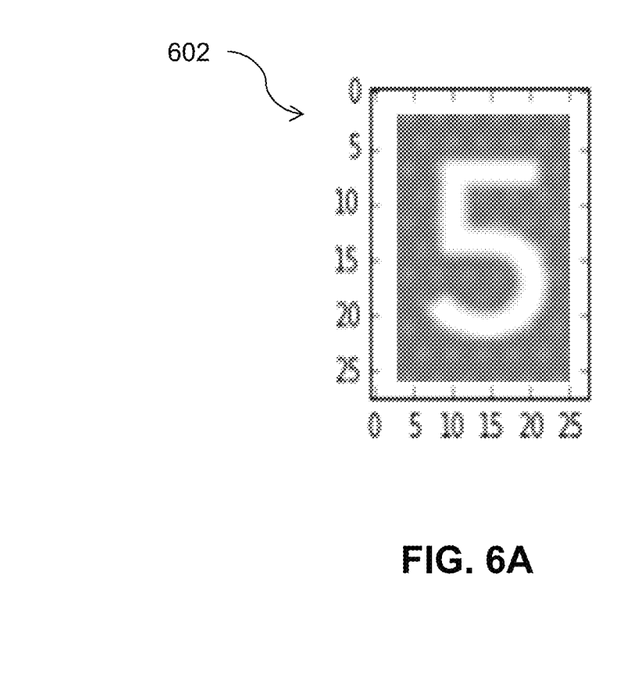
Figure 6B:
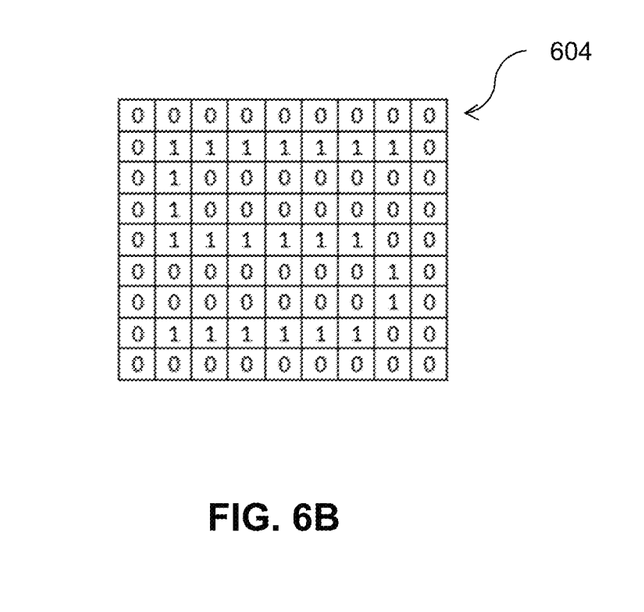
FIG. 6b shows a discretized representation of the character, in accordance with embodiments of the invention.

At step 304a, the one or more pixel images associated with the payment card information is obtained based on the input signals. In various embodiments, the one or more pixel images can be generated using input signals from the capacitive touch sensor 402 in the system 400. Particularly, the one or more pixel images may be generated by a pixel image generation module 410 included in the system 400, which processes the input signals to form the one or more pixel images. The generation of the one or more pixel images may include digitalizing representations of the payment card information within the input signals. In other words, the one or more pixel images are digital representations of the payment card information on the payment card 100. An exemplary representation of a character 602 within the payment card information based on the input signal is shown in FIG. 6a. FIG. 6b shows a pixel image 604 of an exemplary character that may be included in payment card information.

At step 304b, a character within the one or more pixel images is identified. In various embodiments of the present invention, the character within the one or more pixel images can be identified using a trained neural network (also referred herein as a classification algorithm) included within a character recognition module. An example of the character recognition module is shown in FIG. 4 as character recognition module 412. Particularly, the identification of the character within the one or more pixel images can include transmitting the one or more pixel images to a neural network and receiving the identified character within the one or more pixel images. The received character is computer-readable and can be used to determine the orientation of the payment card on the capacitive touch sensor. In alternate embodiments, the neural network may be a deep neural network.

A neural network (i.e. classification algorithm) for character recognition is now described in detail. The neural network is first trained using master data including feature variables and event variables. An event variable includes computer-readable text, and a feature variable includes a corresponding discretized pixel image containing a representation of the computer-readable text. For example, the event variable may be the digit "5" in computer-readable format while the feature variable may be the pixel image discretized using a 20-by-20 grid, a 28-by-28 grid or any suitable grid depending on the resolution of the touch screen sensor and the discretization method (see FIG. 6b). Each grid square includes a binary value based on touch input received by the capacitive touch sensor, where a "1" denotes a touch event registered on the capacitive touch sensor and a "0" denotes the absence of a touch event. Accordingly, once the neural network is trained, the neural network can be capable of identifying any new character within the one or more pixel images and output a computer-readable format of the new character.

At step 304c, a character-orientation set is generated using the identified character. The character-orientation set includes one or more patterns corresponding to the identified character in one or more orientations. Each of the one or more patterns includes a pixel image of the identified character in an orientation and data identifying the orientation. The pixel image can be discretized using a 20-by-20 grid, a 28-by-28 grid or any suitable grid as mentioned above, the grid including a binary representation of the identified character in the orientation. The one or more orientations can be an orientation along any one of the cardinal points (0°, 90°, 180°, and 270°), the ordinal points (45°, 135°, 225°, 315°) or the intermediate points therebetween. In other words, a pattern can show a binary pixel image of the identified character orientated along an angular direction, either along 0°, 45°, 90°, 135°, 180°, 225°, 270°, 315° or any points therebetween. For example, the character-orientation set for the digit "5" can comprise one or more patterns (i.e. orientated pixel images) of the digit "5". Each of the one or more patterns corresponds to a pixel image of the digit "5" orientated along a direction (e.g. along any one of the cardinal points 0°, 90°, 180°and 270°). In other words, the character-orientation set can include 4 patterns, each showing pixel images of the digit "5" in an upright position, or rotated about an angle of 90°, 180°and 270°respectively. Moreover, the number of the one or more orientations can be identical or more than the number of registrable orientations possible for the payment card.

At step 304d, the orientation of the payment card is determined by matching a pattern in the character-orientation set with the identified character within the one or more pixel images. In step 304, each pattern in the character orientation set is first compared with the pixel image of the identified character, the pixel image of the identified character being in the same orientation as the payment card that is placed on the capacitive touch sensor. In embodiments of the present invention, the comparison can include comparing binary value in each grid square of the pattern to be compared with binary value in a corresponding grid square of the pixel image of the identified character. A score associated with the pattern compared is then incremented if the compared binary values are identical. In other words, a score can be computed for each pattern in the character orientation set, the score associated with the degree of similarity between the discretized pixel image and the pixel image of the identified character. The pattern with the highest score within the character orientation set is then identified. The data identifying the orientation of the pattern with the highest score is then read and associated with the orientation of the payment card. For example, if the pattern having the pixel image of the digit "5" rotated about an angle of 90° has the highest score among the character-orientation set, the orientation of the payment card is determined to be 90°.

At step 306, the determined orientation of the payment card is compared with a reference orientation associated with the payment card. The step 306 of comparing the determined orientation with the reference orientation can serve as an authentication step for the method 100 of the present invention, as the reference orientation is known only to the user. This is as the reference orientation is a piece of information known only to the user, that is, the reference orientation can be a knowledge factor in an authentication process. Moreover, the payment card in embodiments of the invention can serve as a possession factor in the authentication process, as the payment card is placed on the capacitive touch sensor and the payment card information read, which can indicate that the payment card is possessed physically by the user.

In the various embodiments, the reference orientation is a registered orientation of the payment card with respect to a default orientation of the capacitive touch sensor. The reference orientation may be any one of thirty-two points of a circle with respect to a default orientation of the capacitive touch sensor. In other words, the reference orientation associated with the payment card may be any one of the cardinal points (0°, 90°, 180°, 270°), the ordinal points (45°, 135°, 225°, 315°) or the intermediate points therebetween. In alternate embodiments, the reference orientation may be limited to any one of eight, sixteen or twenty-four points of a circle with respect to a default orientation of the capacitive touch sensor at the expense of reduced set of orientations.

In some embodiments of the invention, the reference orientation associated with the payment card may be an orientation that is registered for the payment card, the reference orientation being selected by the user at the time of registration. In alternate embodiments, the reference orientation may be generated by the card issuer. The reference orientation may be generated by encrypting payment card information with encryption keys known only to the card issuer. The payment card information used for the encryption may be any one or more of: payment card number, payment card expiration date and card security code.

At step 306, the determined orientation corresponds to the reference orientation on a condition that the determined orientation falls within a predetermined variability threshold associated with the reference orientation. For example, the predetermined variability threshold may be a deviation of less than 4 degrees (angle). In other words, the determined orientation corresponds to the reference orientation if the angular difference between the determined orientation and the reference orientation is less than 4 degrees (angle). It can be appreciated that alternate variability threshold may be used, for example, a deviation of less than 5 degrees, 10 degrees or any other angles. The variability threshold can also be dependent on the number of points of a circle used for the reference orientation. For example, a smaller angle can be used for the variability threshold if thirty-two points of a circle is used for the reference orientation. Alternatively, a larger angular criteria can be used for the variability threshold if the reference orientation may be limited to any one of eight, sixteen or twenty-four points of a circle.

At step 306, if the determined orientation of the payment card fails to correspond to the reference orientation associated with the payment card, the method 100 may further include generating a failure message in response. The failure message may include a message notifying the user that the determined orientation of the payment card has failed to correspond to the reference orientation and/or prompting the user to try again. The method may also further include sending an authentication failure notification to a device that is registered to the payment card account.

The step 308 of generating computer-readable payment card information based on the input signals is performed on the condition that the determined orientation corresponds to the reference orientation. In an embodiment, generating the computer-readable payment information can include:

a. step 308a: identifying a plurality of characters within the one or more pixel images obtained in step 304a, and b. step 308b: generating the computer-readable payment card information using the plurality of identified characters and the one or more pixel images .

At step 308a, the plurality of characters within the one or more pixel images is identified. Similar to step 304a, the plurality of characters within the one or more pixel images can be identified using a first trained neural network, by transmitting the one or more pixel images associated with the payment card information to the first trained neural network and receiving the plurality of identified characters within the one or more pixel images in return. The received plurality of characters is computer-readable, and can be merged to form computer-readable payment card information.

At step 308b, the computer-readable payment card information is generated using the plurality of identified characters. In embodiments of the present invention, the computer-readable payment information is generated by a second trained neural network.

Similar to the first neural network, the second neural network can be trained using master data including relevant feature variables and relevant event variables. The relevant event variables used in the second trained neural network include computer-readable payment card information, while the relevant feature variables include the plurality of identified characters and the one or more pixel images associated with the payment card information. In various embodiments, the one or more pixel images used in the relevant feature variables can be digital representations of the payment card information on specific sets of payment cards issued by existing financial institutions. The one or more pixel images used in the relevant feature variables are similar to those generated by a pixel image generation module 410 included in the system 400, which processes the input signals to form the one or more pixel images. Accordingly, once the neural network is trained, the neural network can be capable of assembling computer-readable payment card information from the plurality of identified characters by matching the plurality of identified characters to each of the characters within the one or more pixel images, and combining the plurality of identified characters. Additionally, the trained neural network can be trained to recognize different arrangements of the payment card information, correctly identify corresponding fields such as a name, card number and expiry date present on payment card and append at least one identifier to the computer-readable payment card information, the identifier uniquely identifying the relevant field to which the computer-readable payment card information belongs. For example, the payment cards used in the relevant feature variables can include Mastercard® World Elite™ payment cards, which has a specific arrangement of the payment card information (e.g. name of cardholder, expiry date and card number). The second neural network can be trained such that the arrangement associated with Mastercard® World Elite™ payment cards is recognized, and that the identifiers uniquely identifying the relevant fields are correctly attributed the computer-readable payment card information. In some embodiments of the present invention, the neural network can be a deep neural network.

FIG. 4 shows a schematic diagram of a system 400 configured to transmit payment card information in accordance with embodiments of the invention. The system 400 includes a touch screen sensor 402, at least one processor 404, at least one memory 406, and an application module 408 including pixel image generation module 410 and character recognition module 412. In an embodiment, the system 400 may be a mobile computing device (e.g. a smartphone) and the application module 408 may be included in the computing device. In alternate embodiments, the application module 408 may be included in a separate application server (not shown). In various embodiments, the system 400 can directly communicate with the one or more servers 414a . . . 414n, which may host payment processor modules (not shown). Alternatively, the payment processor module may be present on the system 400, and the one or more servers 414a . . . 414n host databases storing relevant information forwarded by the payment processor module present within the system 400.

In embodiments of the invention, the at least one memory 406 includes computer program code, and is configured to, with the at least one processor 404, cause the system 400 to (i) receive, from the capacitive touch sensor 402, input signals generated in response to conductive elements of a payment card that is placed on the capacitive touch sensor 402, the conductive elements disposed on the payment card information present on the payment card, (ii) determine, using the input signals, an orientation of the payment card that is placed on the capacitive touch sensor 402, (iii) compare the determined orientation with a reference orientation associated with the payment card, (iv) generate computer-readable payment card information based on the input signals on a condition that the determined orientation corresponds to the reference orientation, and (v) transmit the computer-readable payment card information to a payment processor module.

In various embodiments, the steps (ii), (iii) and (iv) may be performed by the application module 408 including the pixel image generation module 410 and the character recognition module 412, in conjunction with the processor 404 and the memory 406. Specifically, the steps (ii) and (iii) can be performed using at least the pixel image generation module 410 while step (iv) can be performed using at least the character recognition module 412.

Figure 5:
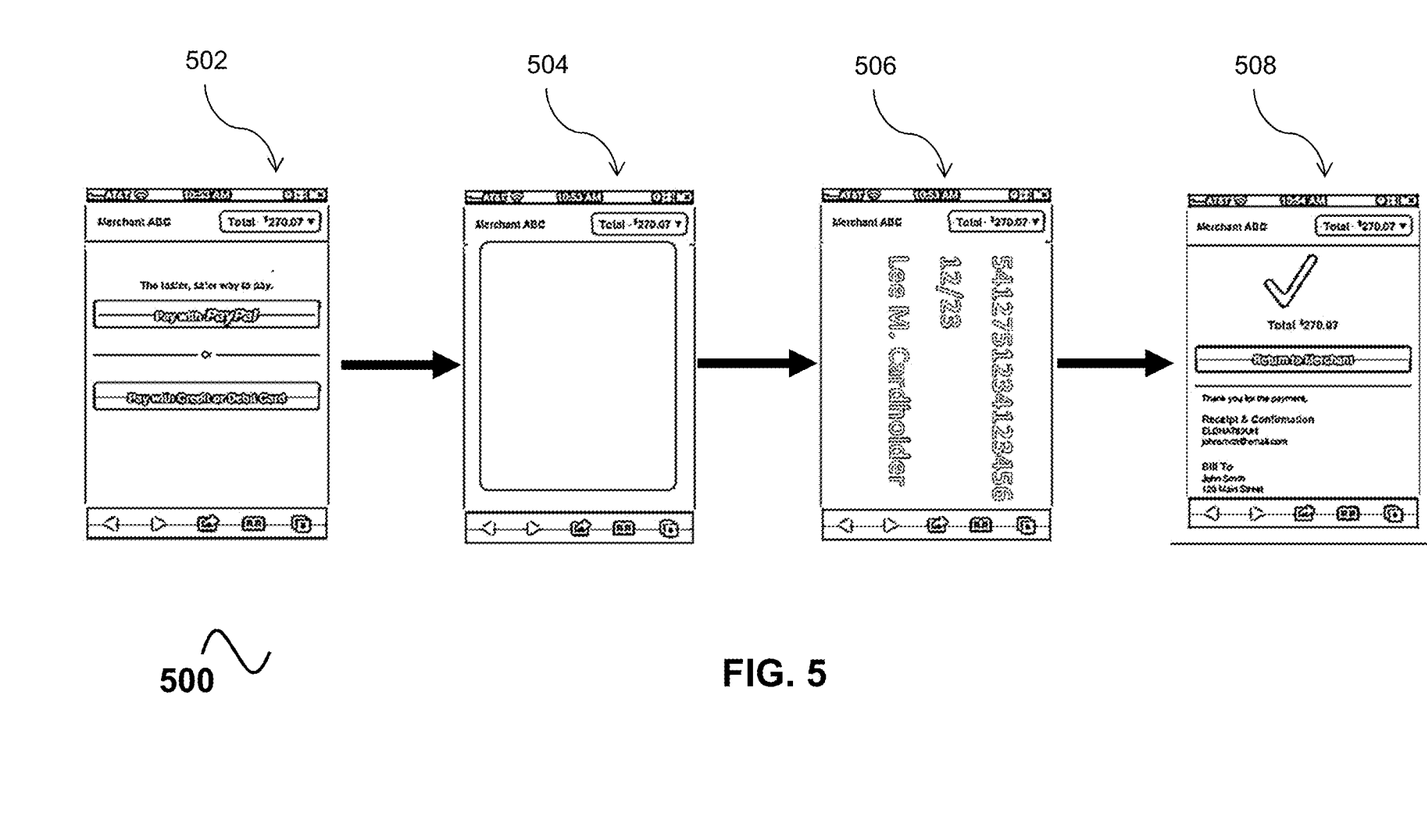
FIG. 5 shows exemplary screenshots seen by a user during an online checkout process in accordance with embodiments of the invention.

FIG. 5 shows exemplary screenshots seen by a user during an online checkout process 500 in accordance with embodiments of the invention. The exemplary screenshots 502, 504, 506, 508 show various pages presented to a user during an online checkout process from a mobile computing device including a capacitive touch sensor. Screenshot 502 shows a page that presented to a user at an exemplary payment method selection stage of the online checkout process, which provides to the user with a payment option Paypal and another payment option via payment card. When the payment card option is selected, a payment card request stage as exemplified in screenshot 504 is presented to the user, prompting the user to place a payment card having conductive elements disposed thereon on the capacitive touch sensor of the mobile device. In some embodiments, the payment card request stage may be integral to the payment process, such that the screenshot 504 appears as an intermediate step in the overall payment process. In alternate embodiments, the user may be directed to a separate website or a different mobile application which implements the method 100 of FIG. 1. Payment card information is then determined using the method 100 of FIG. 1, and the computer-readable payment card information generated by the method 100 of FIG. 1 is displayed to the user, as shown in screenshot 506. The computer-readable payment card information is then transmitted to a payment processor module. Screenshot 508 is displayed to the user after payment request is successfully processed.

Figure 7:
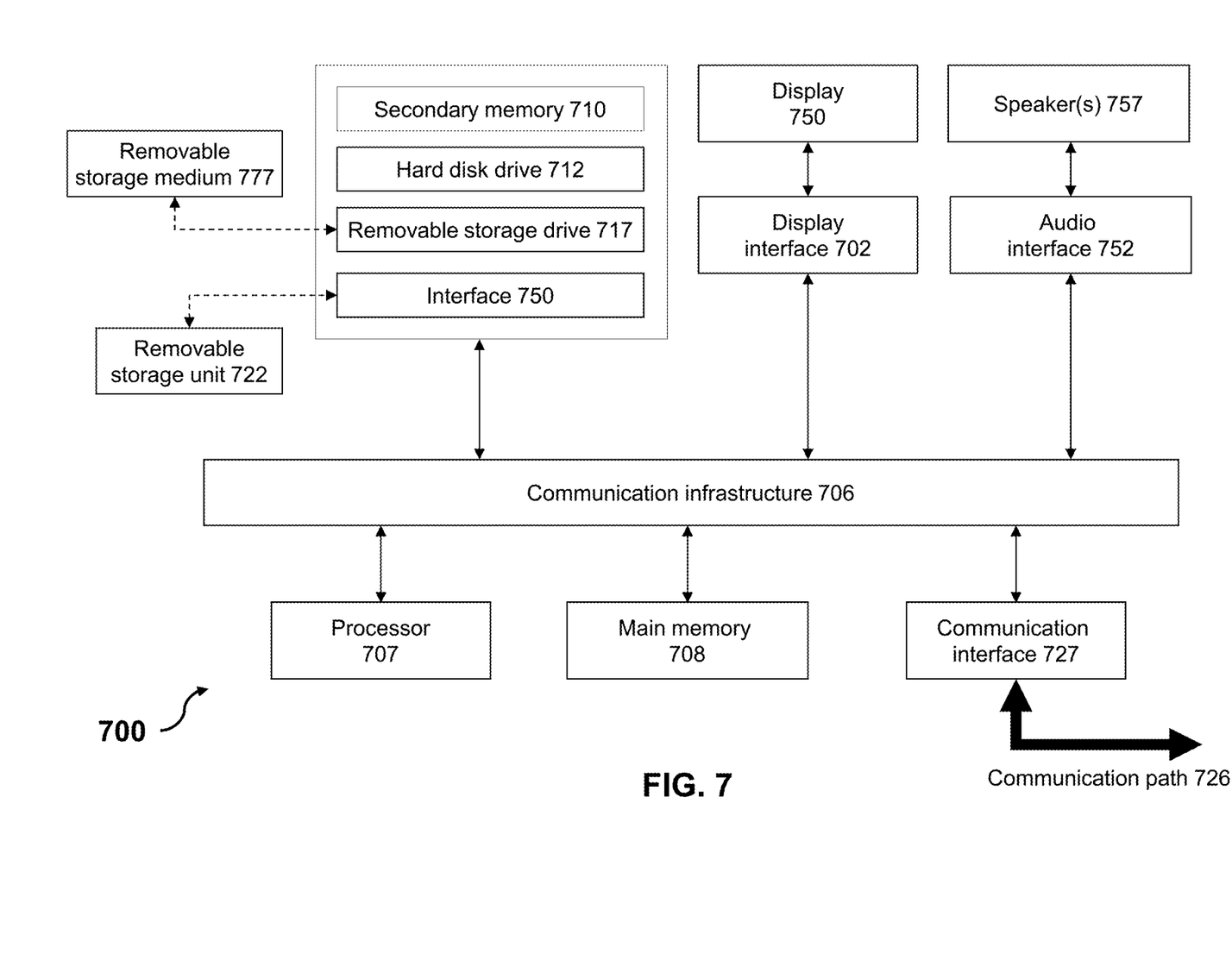
FIG. 7 shows a schematic of a computing device used to realise the payment card information transmission system of FIG. 4.

FIG. 7 depicts an exemplary computing device 700, hereinafter interchangeably referred to as a computer system 700, where one or more such computing devices 700 may be used to execute the method 300 of FIG. 3. The exemplary computing device 700 can also be used to implement the system 400 in FIG. 4. The following description of the computing device 700 is provided by way of example only and is not intended to be limiting.

As shown in FIG. 7, the example computing device 700 includes a processor 707 for executing software routines. Although a single processor is shown for the sake of clarity, the computing device 700 may also include a multi-processor system. The processor 707 is connected to a communication infrastructure 706 for communication with other components of the computing device 700. The communication infrastructure 706 may include, for example, a communications bus, cross-bar, or network.

The computing device 700 further includes a main memory 708, such as a random access memory (RAM), and a secondary memory 710. The secondary memory 710 may include, for example, a storage drive 712, which may be a hard disk drive, a solid state drive or a hybrid drive and/or a removable storage drive 717, which may include a magnetic tape drive, an optical disk drive, a solid state storage drive (such as a USB flash drive, a flash memory device, a solid state drive or a memory card), or the like. The removable storage drive 717 reads from and/or writes to a removable storage medium 777 in a well-known manner. The removable storage medium 777 may include magnetic tape, optical disk, non-volatile memory storage medium, or the like, which is read by and written to by removable storage drive 717. As will be appreciated by persons skilled in the relevant art(s), the removable storage medium 777 includes a computer readable storage medium having stored therein computer executable program code instructions and/or data.

In an alternative implementation, the secondary memory 710 may additionally or alternatively include other similar means for allowing computer programs or other instructions to be loaded into the computing device 700. Such means can include, for example, a removable storage unit 722 and an interface 750. Examples of a removable storage unit 722 and interface 750 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 722 and interfaces 750 which allow software and data to be transferred from the removable storage unit 722 to the computer system 700.

The computing device 700 also includes at least one communication interface 727. The communication interface 727 allows software and data to be transferred between computing device 700 and external devices via a communication path 726. In various embodiments of the inventions, the communication interface 727 permits data to be transferred between the computing device 700 and a data communication network, such as a public data or private data communication network. The communication interface 727 may be used to exchange data between different computing devices 700 which such computing devices 700 form part an interconnected computer network. Examples of a communication interface 727 can include a modem, a network interface (such as an Ethernet card), a communication port (such as a serial, parallel, printer, GPIB, IEEE 1394, RJ45, USB), an antenna with associated circuitry and the like. The communication interface 727 may be wired or may be wireless. Software and data transferred via the communication interface 727 are in the form of signals which can be electronic, electromagnetic, optical or other signals capable of being received by communication interface 727. These signals are provided to the communication interface via the communication path 727.

As shown in FIG. 7, the computing device 700 further includes a display interface 702 which performs operations for rendering images to an associated display 750 and an audio interface 752 for performing operations for playing audio content via associated speaker(s) 757.

As used herein, the term "computer program product" may refer, in part, to removable storage medium 777, removable storage unit 722, a hard disk installed in storage drive 712, or a carrier wave carrying software over communication path 726 (wireless link or cable) to communication interface 727. Computer readable storage media refers to any non-transitory, non-volatile tangible storage medium that provides recorded instructions and/or data to the computing device 700 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 700. Examples of transitory or non-tangible computer readable transmission media that may also participate in the provision of software, application programs, instructions and/or data to the computing device 700 include radio or infra-red transmission channels as well as a network connection to another computer or networked device, and the Internet or Intranets including e-mail transmissions and information recorded on Websites and the like.

The computer programs (also called computer program code) are stored in main memory 708 and/or secondary memory 710. Computer programs can also be received via the communication interface 727. Such computer programs, when executed, enable the computing device 700 to perform one or more features of embodiments discussed herein. In various embodiments, the computer programs, when executed, enable the processor 707 to perform features of the above-described embodiments. Accordingly, such computer programs represent controllers of the computer system 700.

Software may be stored in a computer program product and loaded into the computing device 700 using the removable storage drive 717, the storage drive 712, or the interface 750. The computer program product may be a non-transitory computer readable medium. Alternatively, the computer program product may be downloaded to the computer system 700 over the communications path 727. The software, when executed by the processor 707, causes the computing device 700 to perform the necessary operations to execute the method 300 as shown in FIG. 3.

It is to be understood that the embodiment of FIG. 7 is presented merely by way of example to explain the operation and structure of the system 400. Therefore, in some embodiments one or more features of the computing device 700 may be omitted. Also, in some embodiments, one or more features of the computing device 700 may be combined together. Additionally, in some embodiments, one or more features of the computing device 700 may be split into one or more component parts.

It will be appreciated that the elements illustrated in FIG. 7 function to provide means for performing the various functions and operations of the servers as described in the above embodiments.

When the computing device 700 is configured to realise the system 400 to transmit payment card information, the system 400 will have a non-transitory computer readable medium having stored thereon an application which when executed causes the system 400 to perform steps including: (i) receive, from a capacitive touch sensor, input signals generated in response to conductive elements of a payment card that is placed on the capacitive touch sensor, the conductive elements disposed on the payment card information present on the payment card; (ii) determine, using the input signals, an orientation of the payment card that is placed on the capacitive touch sensor; (iii) compare the determined orientation with a reference orientation associated with the payment card; (iv) generate computer-readable payment card information based on the input signals on a condition that the determined orientation corresponds to the reference orientation; and (v) transmit the computer-readable payment card information to a payment processor module.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A system configured to transmit payment card information, the system comprising:
   at least one processor; and
   at least one memory including computer program code;
   the at least one memory and the computer program code configured to, with the at least one processor, cause the system at least to:
   receive, from a capacitive touch sensor, input signals generated in response to conductive elements, disposed on a first face of a payment card, placed on the capacitive touch sensor, the conductive elements being configured to legibly represent: a name of a payment card account holder associated with the payment card; a payment card number associated with the payment card; and, an expiration date associated with the payment card, wherein the conductive elements are electronically connected to a conductive portion disposed on a second face of the payment card, and, wherein the input signals represent a variance in the electrical properties of the capacitive touch sensor with the conductive elements being placed on the capacitive touch sensor;
   obtain one or more pixel images based on the input signals;
   identify a character within the one or more pixel images;
   generate a character-orientation set using the identified character, the character-orientation set comprising one or more patterns corresponding to the identified character in one or more orientations;
   determine an orientation of the payment card that is placed on the capacitive touch sensor by matching a pattern in the character-orientation set with the identified character within the one or more pixel images;
   to determine if use of the payment card can be authenticated, compare the determined orientation with a reference orientation associated with the payment card, wherein the use of the payment card is authenticated with the determined orientation corresponding to the reference orientation, and wherein the use of the payment card is not authenticated with the determined orientation not corresponding to the reference orientation;
   in response to the use of the payment card not being authenticated, generate a failure message;
   in response to the payment card being authenticated, identify a plurality of characters within the one or more pixel images, and generate computer-readable payment card information using the plurality of identified characters and the one or more pixel images; and
   transmit the generated computer-readable payment card information to a payment processor module.

2. The system of claim 1, wherein the determined orientation corresponds to the reference orientation on a condition that the determined orientation falls within a predetermined variability threshold associated with the reference orientation.

3. The system of claim 1, wherein the conductive elements further legibly represent a card security code associated with the payment card.

4. The system of claim 1, wherein the conductive elements are printed on the first face of the payment card.

5. The system of claim 1, wherein the conductive portion disposed on the second face of the payment card comprises a conductive element configured to legibly represent a card verification code associated with the payment card on the second face of the payment card.

6. A method for transmitting payment card information, the method comprising:

receiving, from a capacitive touch sensor, input signals generated in response to conductive elements, disposed on a first face of a payment card, placed on the capacitive touch sensor, the conductive elements being configured to legibly represent: a name of a payment card account holder associated with the payment card; a payment card number associated with the payment card; and, an expiration date associated with the payment card, wherein the conductive elements are electronically connected to a conductive portion disposed on a second face of the payment card, and, wherein the input signals represent a variance in the electrical properties of the capacitive touch sensor with the conductive elements being placed on the capacitive touch sensor information present on the payment card;

obtaining one or more pixel images based on the input signals;

identifying a character within the one or more pixel images;

generating a character-orientation set using the identified character, the character-orientation set comprising one or more patterns corresponding to the identified character in one or more orientations;

determining an orientation of the payment card that is placed on the capacitive touch sensor by matching a pattern in the character-orientation set with the identified character within the one or more pixel images;

to determine if use of the payment card can be authenticated, comparing the determined orientation with a reference orientation associated with the payment card, wherein the use of the payment card is authenticated with the determined orientation corresponding to the reference orientation, and wherein the use of the payment card is not authenticated with the determined orientation not corresponding to the reference orientation;

in response to the use of the payment card not being authenticated, generating a failure message;

in response to the use of the payment card being authenticated, identifying a plurality of characters within the one or more pixel images, and generating computer-readable payment card information using the plurality of identified characters and the one or more pixel images; and transmitting the generated computer-readable payment card information to a payment processor module.

7. The method of claim 6, wherein the determined orientation corresponds to the reference orientation on a condition that the determined orientation falls within a predetermined variability threshold associated with the reference orientation.

8. The method of claim 6, wherein identifying the character and/or identifying the plurality of characters within the one or more pixel images comprises:

transmitting the one or more pixel images associated with the payment card information to a neural network; and receiving the identified character and/or the plurality of identified characters within the one or more pixel images.

9. The system of claim 1, wherein the conductive elements are embossed on the first face of the payment card.

* * * * *